(12) United States Patent
Takada et al.

(10) Patent No.: US 12,546,793 B2
(45) Date of Patent: Feb. 10, 2026

(54) AUTOMATIC ANALYZER

(71) Applicant: Hitachi High-Tech Corporation, Tokyo (JP)

(72) Inventors: Eiichiro Takada, Tokyo (JP); Yoshihiro Yamashita, Tokyo (JP); Hidetsugu Tanoue, Tokyo (JP); Masashi Fukaya, Tokyo (JP); Fumiya Nehashi, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 1085 days.

(21) Appl. No.: 17/604,518

(22) PCT Filed: Feb. 5, 2020

(86) PCT No.: PCT/JP2020/004289
§ 371 (c)(1),
(2) Date: Oct. 18, 2021

(87) PCT Pub. No.: WO2020/217636
PCT Pub. Date: Oct. 29, 2020

(65) Prior Publication Data
US 2022/0196691 A1    Jun. 23, 2022

(30) Foreign Application Priority Data

Apr. 26, 2019  (JP) .................. 2019-085236

(51) Int. Cl.
*G01N 35/04*    (2006.01)
*G01N 35/00*    (2006.01)
(Continued)

(52) U.S. Cl.
CPC ......... *G01N 35/04* (2013.01); *G01N 35/0092* (2013.01); *G01N 35/025* (2013.01); *G01N 35/1002* (2013.01); *G01N 2035/0444* (2013.01)

(58) Field of Classification Search
None
See application file for complete search history.

(56) References Cited

U.S. PATENT DOCUMENTS 5,334,349 A    8/1994 Kelln et al.
5,420,408 A    5/1995 Weyrauch et al.
(Continued)

FOREIGN PATENT DOCUMENTS

CN    102378916 A    3/2012
EP    0216026 A1    4/1987
(Continued)

OTHER PUBLICATIONS

International Preliminary Report on Patentability mailed Jul. 9, 2021 in International Application No. PCT/JP2020/004289.
(Continued)

*Primary Examiner* — P. Kathryn Wright
(74) *Attorney, Agent, or Firm* — Miles & Stockbridge, P.C.

(57) ABSTRACT

An automatic analyzer for making measurements for different analysis processes by a compact mechanism. The apparatus performs inspection for plural different analysis processes and includes: an incubator for holding plural reaction vessels on circumferential positions, first and second dispensing mechanisms each having a dispensing nozzle capable of arc-shaped movement around a rotational axis and vertical movement, in which a first locus of an arc-shaped movement of the dispensing nozzle of the first dispensing mechanism and a second locus of the arc-shaped
(Continued)

movement of the dispensing nozzle of the second dispensing mechanism intersect the circumference of the incubator where the reaction vessels are arranged, while the first locus and the second locus do not intersect, the first dispensing mechanism is used in a first inspection having a first reaction period, and the second dispensing mechanism is used in a second inspection having a second reaction period longer than the first reaction period.

13 Claims, 5 Drawing Sheets

(51) Int. Cl.
*G01N 35/02* (2006.01)
*G01N 35/10* (2006.01)

(56) References Cited

U.S. PATENT DOCUMENTS

| | | | |
|---|---|---|---|
| 5,434,083 | A | 7/1995 | Mitsumaki et al. |
| 5,897,837 | A | 4/1999 | Mizuno |
| 6,190,617 | B1 | 2/2001 | Clark et al. |
| 2002/0132356 | A1 | 9/2002 | Qureshi et al. |
| 2005/0123445 | A1 | 6/2005 | Blecka et al. |
| 2006/0239860 | A1 | 10/2006 | Evers et al. |
| 2006/0263248 | A1 | 11/2006 | Gomm et al. |
| 2008/0014118 | A1* | 1/2008 | Kitagawa ......... G01N 35/00663 422/63 |
| 2008/0311678 | A1 | 12/2008 | Toshihiro et al. |
| 2008/0318323 | A1 | 12/2008 | Shintani et al. |
| 2009/0117004 | A1 | 5/2009 | Fritchie et al. |
| 2010/0001854 | A1 | 1/2010 | Kojima |
| 2012/0020838 | A1 | 1/2012 | Mimura et al. |
| 2012/0039748 | A1 | 2/2012 | Mimura et al. |
| 2012/0048036 | A1 | 3/2012 | Mimura et al. |
| 2012/0140894 | A1 | 6/2012 | Feuerlein et al. |
| 2012/0301359 | A1 | 11/2012 | Kraemer et al. |
| 2013/0017535 | A1 | 1/2013 | Frey et al. |
| 2015/0104351 | A1* | 4/2015 | Makino ............... G01N 35/025 422/64 |
| 2017/0082646 | A1 | 3/2017 | Wang et al. |
| 2019/0361041 | A1 | 11/2019 | Sasaki et al. |
| 2020/0241029 | A1 | 7/2020 | Kenta et al. |

FOREIGN PATENT DOCUMENTS

| | | |
|---|---|---|
| JP | S63066466 A | 3/1988 |
| JP | 863229371 A | 9/1988 |
| JP | H03048161 A | 3/1991 |
| JP | H06018532 A | 1/1994 |
| JP | H06082460 A | 3/1994 |
| JP | 106-207944 A | 7/1994 |
| JP | 2705471 B2 | 1/1998 |
| JP | 2003-057251 A | 2/2003 |
| JP | 2006-250958 A | 9/2006 |
| JP | 2008-032688 A | 2/2008 |
| JP | 2008-216173 A | 9/2008 |
| JP | 2008-224384 A | 9/2008 |
| JP | 2010217057 A | 9/2010 |
| JP | 2012-132925 A | 7/2012 |
| JP | 2012-189611 A | 10/2012 |
| JP | 2013068442 A | 4/2013 |
| JP | 2013-152240 A | 8/2013 |
| JP | 2013-174536 A | 9/2013 |
| JP | 5286120 B2 | 9/2013 |
| JP | 2016-161295 A | 9/2016 |
| JP | 2016-176777 A | 10/2016 |
| JP | 2018054292 A | 4/2018 |
| JP | 2019002771 A | 1/2019 |
| WO | 2006107016 A1 | 10/2006 |
| WO | 2010117044 A1 | 10/2010 |
| WO | 2015183800 A1 | 12/2015 |
| WO | 2018155049 A1 | 8/2018 |
| WO | 2019053991 A1 | 3/2019 |

OTHER PUBLICATIONS

Written Opinion mailed Mar. 19, 2020 in International Application No. PCT/JP2020/004289.
Search Report mailed Mar. 19, 2020 in International Application No. PCT/JP2020/004289.
Examination Report mailed Mar. 25, 2022 in Indian Application No. 202117047988.
Search Report mailed Dec. 23, 2022 in European Application No. 20796400.8.
Search Report mailed Aug. 7, 2018 in International Application No. PCT/JP2018/023577.
Written Opinion mailed Aug. 7, 2018 in International Application No. PCT/JP2018/023577.
Office Action mailed Apr. 15, 2024 in Chinese Application No. 202080030329.6.

* cited by examiner

| APPARATUS CYCLE | BIOCHEMICAL SEQUENCE | INCUBATOR 1 | FIRST DISPENSING MECHANISM 8 | TRANSPORT MECHANISM 17 |
|---|---|---|---|---|
| 1 | 1 | 1.5 ROTATION-1 | FIRST REAGENT DISPENSING | |
| 2 | | 1.5 ROTATION-1 | SECOND REAGENT DISPENSING | INSTALLATION → TAKE OUT |

| APPARATUS CYCLE | IMMUNO SEQUENCE | INCUBATOR 1 | SECOND DISPENSING MECHANISM 9 | TRANSPORT MECHANISM 17 |
|---|---|---|---|---|
| 1 | 1 | 1.5 ROTATION-1 | | INSTALLATION |
| 2 | | 1.5 ROTATION-1 | | |
| 3 | | 1.5 ROTATION-1 | | TAKE OUT |
| 4 | | 1.5 ROTATION-1 | FIRST REAGENT DISPENSING | |
| 5 | | 1.5 ROTATION-1 | | |
| 6 | | 1.5 ROTATION-1 | SECOND REAGENT DISPENSING | |

AUTOMATIC ANALYZER

TECHNICAL FIELD

The present invention relates to an automatic analyzer.

BACKGROUND ART

An automatic analyzer that performs quantitative/qualitative analysis of a specific component contained in a biological sample such as blood or urine (hereinafter called a specimen) is indispensable for current diagnoses, etc. since it provides high reproducibility of analysis results and high processing speed.

Known among the measuring methods that are used in automatic analyzers are an analysis method using a reagent that changes the color of the reaction liquid by reaction with an analysis object component in a specimen (colorimetric analysis) and an analysis method that uses a reagent as a substance specifically binding to an analysis object component in a specimen directly or indirectly, to which a marker is added, and counts the markers (immunoassay). Both of these methods include a process in which the specimen contained in a specimen vessel and the reagent contained in a reagent vessel are dispensed into a reaction vessel by a dispensing device or the like and mixed.

In conventional clinical inspection, various tests such as an immunoserologic test and blood coagulation test have been conducted separately by special devices for the respective tests. Therefore, the inspection requires transportation of the specimen between the special devices, loading of the specimen on each special device, operation to request an analysis, summarization of output results and the like, so it is inefficient. For this reason, multifunctional automatic analyzers that can make measurements, on their own, for tests in a plurality of different analysis processes, such as a biochemical test, immunoserologic test and blood coagulation test, have been proposed.

Patent Literature 1 discloses an automatic analyzer that can independently make measurements for several types of analysis that are different in terms of measurement accuracy, such as biochemical analysis and immunological analysis, and shares the components in the analyzer to achieve compactness.

Patent Literature 2 discloses an automatic analyzer that can perform both photometrical analysis and flow system analysis on its own and includes a common disk for reaction and pretreatment.

Patent Literature 3 discloses an automatic analyzer that can suppress the influence of carryover, in which, when a reaction vessel is repeatedly used by cleaning it, in order to minimize the unfavorable influence of residues left after cleaning, test types are classified depending on the magnitude of influence of carryover and for example, a reaction vessel placed at an even-numbered position of the incubator is used for the first type of test and a reaction vessel placed at an odd-numbered position of the incubator is used for the second type of test.

CITATION LIST

Patent Literature

Patent Literature 1: WO 2006/107016
Patent Literature 2: Japanese Patent Application Laid-Open No. 2010-217057
Patent Literature 3: WO 2015/183800

SUMMARY OF INVENTION

Technical Problem

The automatic analyzer in Patent Literature 1 includes a plurality of measuring units, in which, for example, a first measuring unit makes measurements using transmitted light or scattering light and a second measuring unit makes measurements using chemiluminescence or fluorescence. Here, these units are structured to be supplied with a reagent from a common reagent supply unit and dispensing of the reagent is performed by a suspension type reagent dispensing pipetter. For the suspension type reagent dispensing pipetter, the dispensing position can be defined by X coordinate and Y coordinate, providing a high degree of freedom, but the mechanism is large, which is a limiting factor from the viewpoint of compactness. Also, as for measurement by the second measuring unit, dispensing of the specimen and dispensing of some reagent are performed by the first measuring unit and a process different (longer) in reaction time is performed by the second measuring unit. This is so done in order to ensure that the long reaction time included in the measurement using chemiluminescence or fluorescence can be taken. On the other hand, if one measuring unit can perform a plurality of analysis processes different in reaction time, the analyzer can be more compact because one measuring unit can be removed.

In the automatic analyzer in Patent Literature 2, reaction and pretreatment for a biochemical test, flow system test (immunoserologic test, blood coagulation test, electrolyte test, etc.) are performed on a common disk. The rotation of the common disk is cyclic and the cycle is set according to the analysis timing of the photometric mechanism. For this reason, a dispensing mechanism capable of moving to a desired vessel on the common disk without limitation is used as a specimen dispensing mechanism for re-sampling. This kind of dispensing mechanism is exemplified by an XY rail type dispensing mechanism, which is large in scale as a mechanism and is a limiting factor from the viewpoint of compactness, as in Patent Literature 1.

The automatic analyzer in Patent Literature 3 has a common aspect to the present invention in the point that the position in which a reaction vessel is installed on the incubator is differentiated according to the type of test, which will be described later. However, there is no description of the method that controls the reaction time appropriately if the reaction time differs according to test. In addition, since Patent Literature 3 does not describe the concrete structures of the transporting mechanism and dispensing mechanism, what kind of mechanism differentiates the positions of reaction vessels according to the test type is unclear.

Solution to Problem

An automatic analyzer as an embodiment of the present invention is an automatic analyzer capable of performing inspection for plural different analysis processes, comprising: an incubator for holding plural reaction vessels each at a circumferential position; a first dispensing mechanism having a first dispensing nozzle capable of arc-shaped movement around a rotational axis as a center and vertical movement, and dispensing a sample or a reagent to the reaction vessel on the incubator; and a second dispensing mechanism having a second dispensing nozzle capable of arc-shaped movement around a rotational axis as a center and vertical movement, and dispensing a sample or a reagent to the reaction vessel on the incubator. The inspection includes a first inspection and a second inspection and a reaction time from dispensing of the reagent into a specimen solution to completion of the reaction between the specimen solution and the reagent is predetermined in the first inspection and the second inspection. The first locus of the arc-shaped movement of the first dispensing nozzle and the second locus of the arc-shaped movement of the second dispensing nozzle intersect the circumference of the incubator on which the reaction vessels are arranged, each at two positions and the first locus and the second locus do not intersect. The first dispensing mechanism is used for dispensing operation in the first inspection having a first reaction time and the second dispensing mechanism is used for dispensing operation in the second inspection having a second reaction time which is longer than the first reaction time.

An automatic analyzer as another embodiment of the present invention is an automatic analyzer capable of performing inspection for plural different analyzing processes, comprising: an incubator for holding plural reaction vessels on circumferential positions; a transporting mechanism for supplying the reaction vessels to the incubator; and a control part. The inspection includes a first inspection and a second inspection, and a reaction time from dispensing of a reagent into a specimen solution to the completion of the reaction between the specimen solution and the reagent is predetermined in the first inspection and the first inspection. The control part operates the transporting mechanism in accordance with the first sequence defined previously for the first inspection and the second sequence defined previously for the second inspection. The first sequence and the second sequence are each defined as a sequence including an even number of apparatus cycles of a predetermined period and the incubator is defined to move in a predetermined direction by {(k+0.5) rotations±1 position} (k: 0 or greater integer). In a case where the operation of the transporting mechanism is defined to be executed in an even-numbered apparatus cycle in the first sequence, the operation of the transporting mechanism is defined to be executed in an odd-numbered apparatus cycle in the second sequence, and in a case where the operation of the transporting mechanism is defined to be executed in an odd-numbered apparatus cycle in the first sequence, the operation of the transporting mechanism is defined to be executed in an even-numbered apparatus cycle in the second sequence.

Advantageous Effects of Invention

There is provided an automatic analyzer that can make measurements for different analysis processes with a compact mechanism.

The further objects and novel features of the invention will more fully appear from the description in this specification and the accompanying drawings.

BRIEF DESCRIPTION OF DRAWINGS

FIG. 3A is an operation table for related mechanism in a biochemical sequence;
FIG. 3B is an operation table for related mechanism in an immuno sequence.

DESCRIPTION OF EMBODIMENTS

Next, an embodiment of the present invention will be described referring to drawings.

Figure 1:
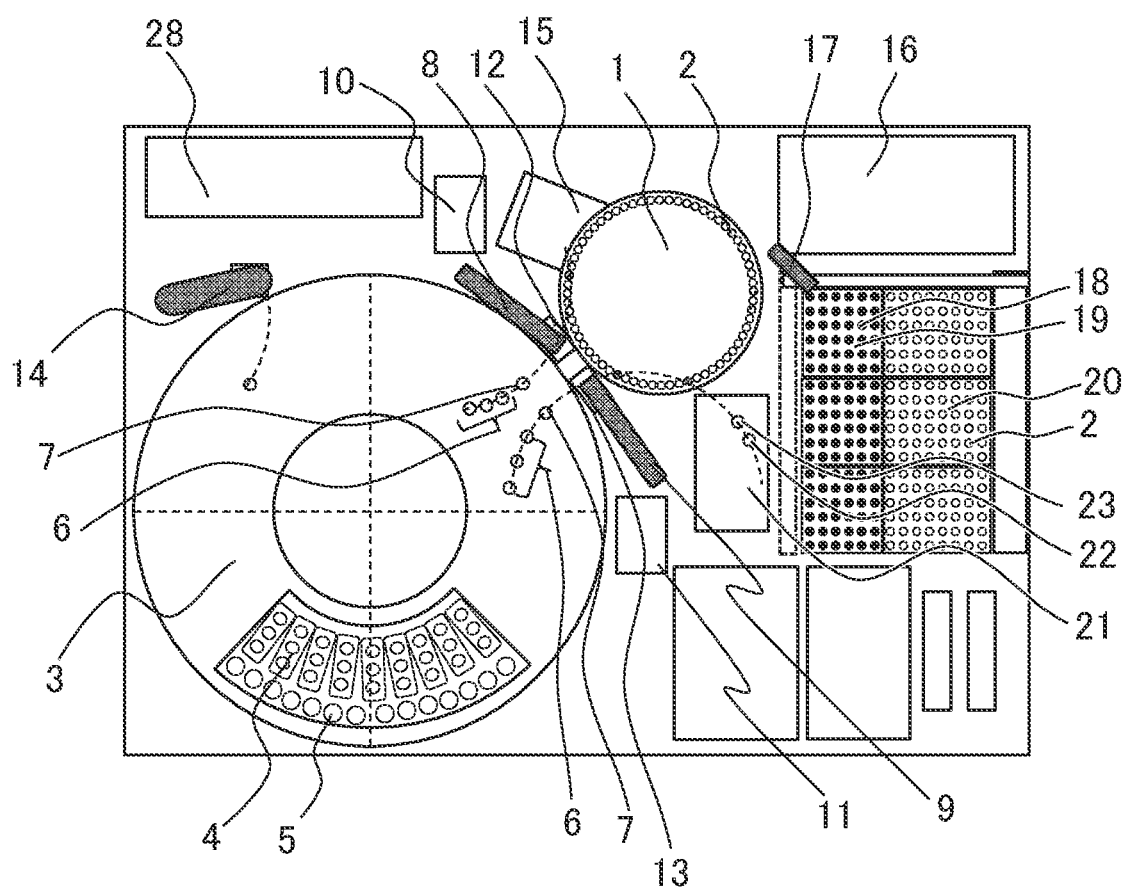
FIG. 1 is a schematic entire configurational view of an automatic analyzer.

FIG. 1 schematically shows the entire configuration of the automatic analyzer. In FIG. 1, reaction vessels 2 are arranged on the circumferential positions of an incubator 1. The same reaction vessels 2 are used for all reactions and they are disposable. The reaction vessels 2 are housed in a reaction vessel tray 20 and supplied to the incubator 1 by a dispensing tip/reaction vessel transporting mechanism 17. The incubator 1 is controlled to be rotated for a distance equivalent to a specified number of reaction vessel positions in one cycle, by a driving mechanism like a motor.

A plurality of reagent bottles 4 and specimen vessels 5 can be loaded in a containing part in common with reagent-specimen 3. In this example, the reagent bottles 4 are positioned inside the specimen vessels 5. However, instead, the specimen vessels 5 may be positioned inside the reagent bottles 4 or the reagent bottles 4 and specimen vessels 5 are separately positioned in a circumferential direction instead of in a radial direction.

A first dispensing mechanism 8 and a second dispensing mechanism 9 each capable of arc-shaped (rotary) movement and vertical movement and having a dispensing nozzle are installed between the incubator 1 and the containing part in common with reagent-specimen 3. The dispensing nozzles are connected to pumps 10 and 11, respectively.

The first dispensing mechanism 8 and second dispensing mechanism 9 should be used for different analysis processes. For example, if the first dispensing mechanism 8 is used for biochemical processes and the second dispensing mechanism 9 is used for immunological processes, the first dispensing mechanism 8 dispenses a specimen and a reagent for biochemical inspection and the second dispensing mechanism 9 dispenses a specimen and a reagent for immuno inspection. For a specimen to be subjected to both biochemical inspection and immuno inspection, at the time of biochemical inspection the first dispensing mechanism 8 accesses it for dispensing and at the time of immuno inspection the second dispensing mechanism 9 accesses it for dispensing. For the second dispensing mechanism 9 for immuno inspection, the need to prevent contamination between specimens is high, so a dispensing tip 18 is installed onto the dispensing nozzle for dispensing. Dispensing tips 18 are housed in a dispensing tip tray 19. A dispensing tip 18 is supplied to a dispensing tip installation position 22 by the dispensing tip/reaction vessel transporting mechanism 17 and installed onto the dispensing nozzle at the dispensing tip installation position 22.

The dispensing nozzles move around a rotational axis as a center like drawing an arc and dispenses a specimen from a specimen vessel to a reaction vessel. On the trajectory of each dispensing nozzle, there are a reagent aspirating position 6 and a specimen aspirating position 7 on the containing part in common with reagent-specimen 3, a first dispensing position and a second dispensing position on the incubator 1, and a cleaning tank 12 (13) for cleaning the dispensing nozzle. For the second dispensing mechanism 9, since it uses a dispensing tip, there are a dispensing tip installation position 22 and a dispensing tip discarding position 23 on its trajectory in addition to the above positions. The first dispensing mechanism 8 and second dispensing mechanism 9 must be arranged so that the trajectories of their dispensing nozzles or the mechanisms do not interfere with each other physically.

A specimen and a reagent are aspirated by the dispensing nozzle for biochemical inspection or the dispensing tip installed on the dispensing nozzle for immuno inspection and the specimen and reagent are stirred and mixed by aspirating and discharging operation of the dispensing nozzle or dispensing tip in a reaction vessel 2. Pipetting operation of the dispensing nozzle or dispensing tip to stir the specimen and reagent as mentioned above eliminates the need for a stirring mechanism to stir the specimen and reagent. The reaction vessel 2 that contains a reaction liquid as a mixture of the specimen and reagent is controlled at a prescribed temperature by the incubator 1 and the reaction is accelerated for a prescribed time period.

A spectrophotometer 15 for biochemical inspection is installed around the incubator 1. The spectrophotometer 15 includes a light source and a detector (both not shown) and disperses the transmitted light obtained by irradiating the reaction liquid as the mixture of the specimen and reagent with the light source, detects it and thereby measures the absorbance of the reaction liquid.

In addition, the reaction liquid made to react for a prescribed time period by the incubator 1 is measured by a detection mechanism 16 for immuno inspection. In immuno inspection, some of the methods for detecting a marker substance are based on the principle of electrochemical luminescence or chemiluminescence and a second liquid and marker substance and the structure and physical property of the detection area that are suitable for each method are selected and the amount of luminescence derived from the luminescent reaction of the marker substance is measured by a photomultiplier as a detector.

In biochemical inspection, the reaction vessel 2 that has finished the measurement of absorbance in the incubator 1 is discarded into a dispensing tip/reaction vessel discarding box 21 by the dispensing tip/reaction vessel transporting mechanism 17. In immuno inspection, transportation of the reaction vessel 2 containing the reaction liquid made to react for a prescribed time period by the incubator 1 to the detection mechanism 16 and transportation of the reaction vessel 2 having finished the measurement in the detection mechanism 16 to the dispensing tip/reaction vessel discarding box 21 are also performed by the dispensing tip/reaction vessel transporting mechanism 17.

The mechanisms of the automatic analyzer are connected to a control part 28. The control part 28 controls various mechanisms for rotation of the incubator, rotation inside the containing part in common with reagent-specimen, driving of the specimen nozzle, aspiration of the specimen and discharge of the specimen. In FIG. 1, the connections of the mechanisms constituting the automatic analyzer to the control part are omitted for the simplicity of illustration.

The operation of each mechanism of the automatic analyzer is performed in accordance with an operation sequence defined in terms of cycles regardless of the content of an individual inspection. On the other hand, in inspection by the automatic analyzer, if a plurality of reagents are dispensed (hereinafter, the reagent put in first is called the "first reagent" and the reagent put in next to the first reagent is called the "second reagent"), the time period from dispensing of the first reagent to completion of reaction with the first reagent and the time period from dispensing of the second reagent to completion of reaction with the second reagent are predetermined and in order to obtain correct inspection results, the operation sequence must be set so that these reaction time periods are observed. Although the automatic analyzer in this embodiment uses the same incubator for reaction in both biochemical inspection and immuno inspection, the reaction time largely differs between biochemical inspection and immuno inspection. The mechanisms of the automatic analyzer must be designed so that biochemical inspection and immuno inspection, which differ in reaction time, are performed in accordance with operation sequences using the common mechanisms such as the incubator 1.

For example, in biochemical inspection, it is assumed that the reaction time from dispensing of the first reagent to dispensing of the second reagent is about 5 minutes and the whole reaction time is about 10 minutes. The whole reaction time refers to the time period from dispensing of the first reagent to completion of reaction of the specimen with the dispensed reagents. In immuno inspection, it is assumed that the reaction time from dispensing of the first reagent to dispensing of the second reagent is about 9 minutes and the whole reaction time is about 18 minutes. In the case of biochemical inspection, measurement by the spectrophotometer 15 is made while the reaction vessel 2 into which the specimen and reagent have been dispensed is placed on the incubator 1, so after the whole reaction time has elapsed, the inspection is ended and the reaction vessel is taken out of the incubator 1. On the other hand, in the case of immuno inspection, after the whole reaction time has elapsed, the reaction vessel is taken out of the incubator 1 and transported to the detection mechanism 16.

Figure 2:
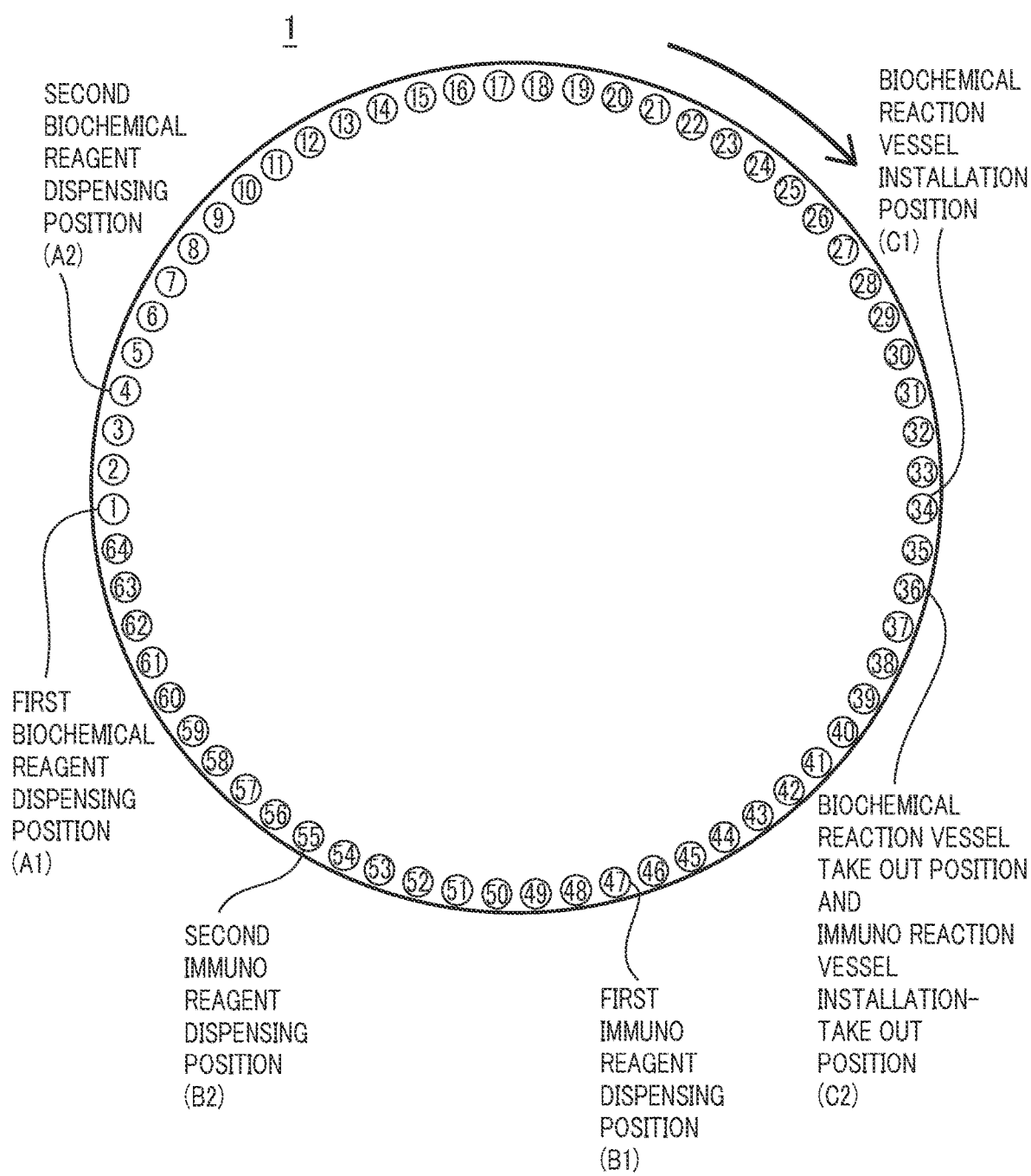
FIG. 2 is a view showing access positions to an incubator.

FIG. 2 is an enlarged view of the incubator 1 in FIG. 1. The circles in the incubator 1 represent the installation positions of reaction vessels 2 and a maximum of 64 reaction vessels 2 can be installed. The number in each circle is used to identify the position at which a reaction vessel 2 is installed. In this example, the first biochemical reagent dispensing position A1 is taken as Position 1 and position numbers 1 to 64 are assigned to all the positions in the clockwise direction. In this example, since the incubator 1 is assumed to turn clockwise, the numbers are assigned along the direction of rotation of the incubator 1. In the explanation below, the state in which Position 1 of the incubator 1 is the first reagent dispensing position A1 in biochemical inspection (the state shown in FIG. 2) may be referred to as the reference state.

FIG. 2 also shows the positions at which the related mechanism accesses a reaction vessel 2 on the incubator 1. In the reference state, the first reagent dispensing position A1 for the first dispensing mechanism 8 (for biochemical inspection) is Position 1, the second reagent dispensing position A2 for the first dispensing mechanism 8 is Position 4, the first reagent dispensing position B1 for the second dispensing mechanism 9 (for immuno inspection) is Position 47, and the second reagent dispensing position B2 for the second dispensing mechanism 9 is Position 55. Furthermore, in biochemical inspection, the reaction vessel installation position C1 for the dispensing tip/reaction vessel transporting mechanism 17 is Position 34 and the reaction vessel take out position C2 is Position 36 and in immuno inspection, the reaction vessel installation position and reaction vessel take out position for the dispensing tip/reaction vessel transporting mechanism 17 are both the same as the reaction vessel take out position C2 in biochemical inspection.

FIG. 3A shows operations of related mechanisms in one dispensing sequence in biochemical inspection (called a biochemical sequence) in the form of Table 301. For example, an apparatus cycle is assumed to be 10 seconds. A biochemical sequence consists of two apparatus cycles. In each apparatus cycle, the incubator 1 turns clockwise 1.5 rotations−1 position (=95 positions) (in this example, one rotation is equal to 64 positions as shown in FIG. 2). In the first apparatus cycle, the first dispensing mechanism 8 performs the first reagent dispensing operation for the reaction vessel at the first reagent dispensing position A1 and in the second apparatus cycle, it performs the second reagent dispensing operation for the reaction vessel at the second reagent dispensing position A2. As explained above in reference to FIG. 1, the first reagent dispensing operation includes dispensing of the specimen and first reagent and stirring by pipetting with the dispensing nozzle, and the second reagent dispensing operation includes dispensing of the second reagent and stirring by pipetting with the dispensing nozzle. The dispensing tip/reaction vessel transporting mechanism 17 installs the reaction vessel at the reaction vessel installation position C1 in the second apparatus cycle and also takes out the reaction vessel from the reaction vessel take out position C2.

FIG. 3B shows operations of related mechanisms in one dispensing sequence in immuno inspection (called an immuno sequence) in the form of Table 302. An immuno sequence consists of six apparatus cycles. The second dispensing mechanism 9 performs the first reagent dispensing operation for the reaction vessel at the first reagent dispensing position B1 in the fourth apparatus cycle and performs the second reagent dispensing operation for the reaction vessel at the second reagent dispensing position B2 in the sixth apparatus cycle. As explained above in reference to FIG. 1, the first reagent dispensing operation includes dispensing of the specimen and first reagent and stirring by pipetting with the dispensing tip, and the second reagent dispensing operation includes dispensing of the second reagent and stirring by pipetting with the dispensing tip. The dispensing tip/reaction vessel transporting mechanism 17 installs the reaction vessel at the reaction vessel installation position C2 in the first apparatus cycle and takes out the reaction vessel from the reaction vessel take out position C2 in the third apparatus cycle.

In the automatic analyzer in this embodiment, the dispensing cycles for biochemical inspection as shown in Table 301 and the dispensing cycles for immuno inspection as shown in Table 302 are performed concurrently. Therefore, for example, the first biochemical sequence is performed in the first and second apparatus cycles of the first immuno sequence; the second biochemical sequence is performed in the third and fourth apparatus cycles of the first immuno sequence; and the third biochemical sequence is performed in the fifth and sixth apparatus cycles of the first immuno sequence. Although the dispensing tip/reaction vessel transporting mechanism 17 is used for both the dispensing sequences, it is used only in an even-numbered apparatus cycle of the biochemical sequence and only in an odd-numbered apparatus cycle of the immuno sequence, so it can be used without any problem. Also, in the fourth apparatus cycle or sixth apparatus cycle of the immuno sequence, while the second dispensing mechanism 9 for immuno inspection aspirates a reagent and a specimen, the first dispensing mechanism 8 for biochemical inspection also aspirates a reagent and a specimen, which means that the first dispensing mechanism 8 and second dispensing mechanism 9 both access the containing part in common with reagent-specimen 3 in the same apparatus cycle. For this reason, the timing to access the containing part in common with reagent-specimen 3 is controlled so as not to overlap to prevent both the dispensing mechanisms from interfering with each other. Therefore, part of the first reagent dispensing operation may be performed as preparatory operation in the first to third apparatus cycles of the immuno sequence. Preparatory operation may include installation of the dispensing tip and aspiration of the specimen and first reagent. Similarly, part of the second reagent dispensing operation may be performed in the fifth apparatus cycle of the immuno sequence as preparatory operation.

When the related mechanisms are arranged so that dispensing or installation or taking out of a reaction vessel can be performed as shown in FIG. 2 and the dispensing sequences as shown in FIG. 3A and FIG. 3B are adopted, the dispensing sequences for biochemical inspection and immuno inspection that satisfy the reaction times given as an example can be achieved. A detailed description is given below.

First, according to the dispensing sequences in this embodiment, a reaction vessel for use in biochemical inspection is installed, for example, at an odd-numbered position in the reference state and a reaction vessel for use in immuno inspection is installed at an even-numbered position in the reference state. In other words, in the incubator 1 having an even number of positions, reaction vessels for use in biochemical inspection and reaction vessels for use in immuno inspection are arranged alternately. The reason is as follows.

In each apparatus cycle, the incubator 1 turns clockwise 1.5 rotations−1 position (=95 positions). As shown in Table 301, in biochemical inspection, since a reaction vessel is installed every two apparatus cycles, if a reaction vessel is installed at an odd-numbered position, for example, Position (i−1) (i: 4 or greater even number) in a biochemical sequence, in the next biochemical sequence, a reaction vessel is installed at Position (i−3). By repeating the biochemical sequence in this way, the odd-numbered positions of the incubator 1 are filled with reaction vessels for use in biochemical inspection and no such reaction vessels are installed at the even-numbered positions.

On the other hand, in immuno inspection, a reaction vessel is installed in the first apparatus cycle as shown in Table 302. Here, if the reaction vessel installation position C1 in biochemical inspection (see FIG. 2) is an odd-numbered position in the second apparatus cycle, the reaction vessel installation position C2 in immuno inspection which is two positions away from it would also be an odd-numbered position. Therefore, in the first apparatus cycle, one apparatus cycle before that, the reaction vessel installation position C2 is an even-numbered position. In immuno inspection, in which reaction time is longer than in biochemical inspection, a reaction vessel is installed every six apparatus cycles, so if in an immuno sequence, a reaction vessel is installed at an even-numbered position, for example, Position i (i: 8 or greater even number), in the next immuno sequence a reaction vessel is installed at Position (i−6). By repeating the immuno sequence in this way, while the even-numbered positions of the incubator 1 are filled with reaction vessels for use in immuno inspection, no such reaction vessels are installed at the odd-numbered positions.

The points that make it possible to install reaction vessels for biochemical inspection and ones for immuno inspection at the positions of the incubator 1 alternately as mentioned above are summarized as follows.

(1) The incubator 1 is rotated so that each time a biochemical sequence with a shorter reaction time is completed, it shifts two positions, and one biochemical sequence is defined by two apparatus cycles. In this case, the direction of rotation of the incubator 1 may be clockwise or counterclockwise and the incubator 1 may shift minus two positions or plus two positions.

For a biochemical sequence, the dispensing sequence is determined so that dispensing of the first reagent is performed in one Of the two apparatus cycles of the biochemical sequence and dispensing of the second reagent and installation and taking out of the reaction vessel are performed in the other apparatus cycle. Consequently, dispensing of the first reagent and stirring can be performed in the apparatus cycle next to the apparatus cycle in which the reaction vessel has been installed.

(2) The amount of rotation of the incubator 1 in one apparatus cycle should be {(k+0.5) rotations±1 position} (k: 0 or greater integer). Consequently, the distance between the dispensing position and the reaction vessel installation-take out position can be sufficient so that the mechanisms related to dispensing can be arranged easily.

(3) An immuno sequence is also defined by an even number of apparatus cycles. The quotient obtained by dividing the number of apparatus cycles of the immuno sequence by 2 should be an odd number. For example, in the case of Table 302, since the number of apparatus cycles is 6, the quotient is 3 (odd number). Consequently, the even-numbered positions of the incubator 1 can be filled with reaction vessels for used in immuno inspection.

(4) Since not only the incubator 1 but also the dispensing tip/reaction vessel transporting mechanism 17 for installing and taking out a reaction vessel are shared for biochemical sequences and immuno sequences, if a reaction vessel is installed and taken out in an even-numbered (odd-numbered) apparatus cycle in a biochemical sequence, a reaction vessel is installed and taken out in an odd-numbered (even-numbered) apparatus cycle in an immuno sequence.

Figure 4:
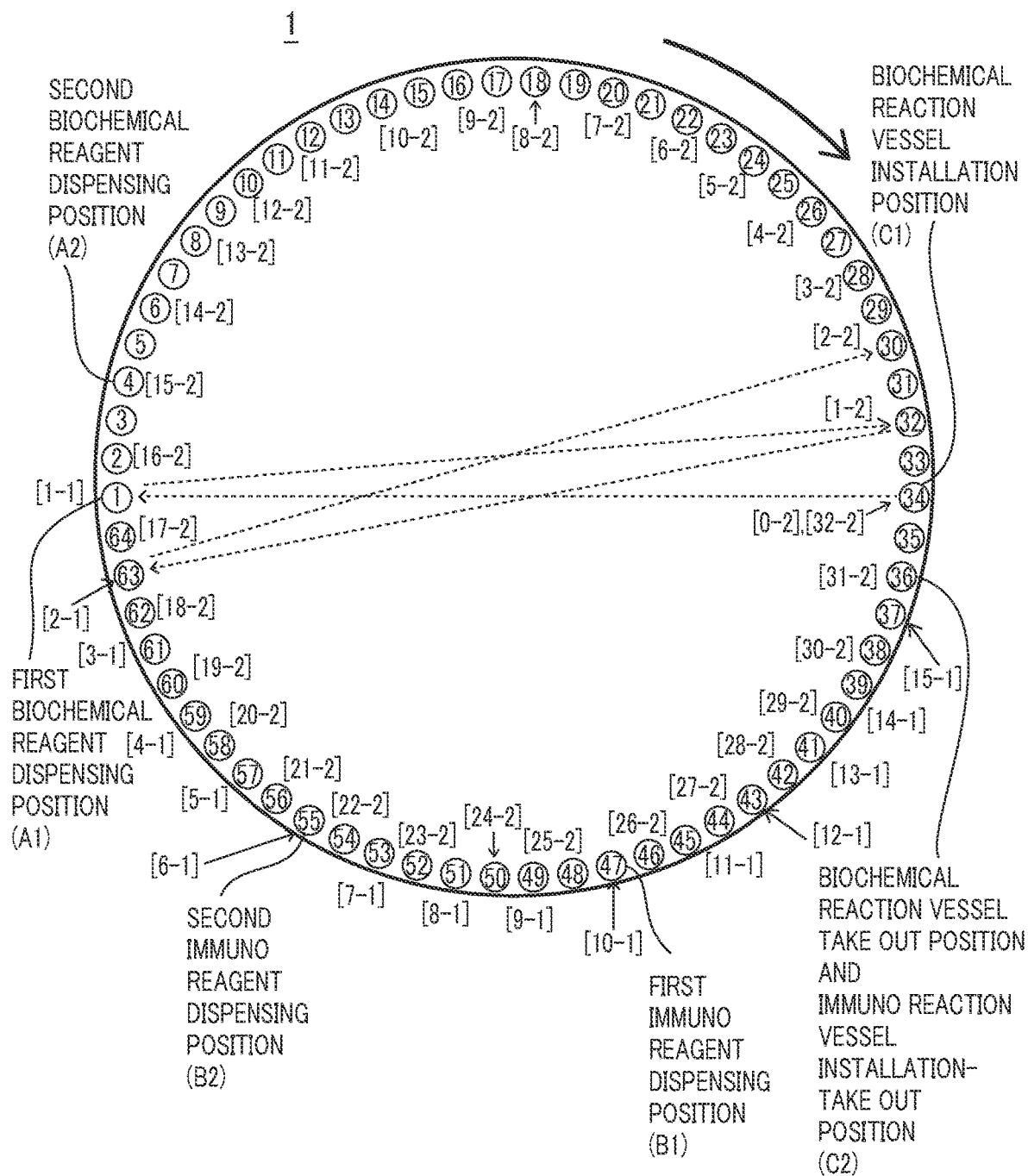
FIG. 4 is a view showing transportation of reaction vessels on an incubator in a biochemical sequence.

FIG. 4 focuses biochemical sequences in the automatic analyzer, showing how the reaction vessel at Position 1 moves on the incubator 1 in the first apparatus cycle of the first biochemical sequence. The biochemical sequence is the one shown in Table 301. Timing is expressed in the form of [biochemical sequence-apparatus cycle] in the figure. For example, [2-1] in Position 63 indicates that the reaction vessel concerned is located at Position 63 in the first apparatus cycle of the second biochemical sequence.

For the reaction vessel at Position 1 in the first apparatus cycle of the first biochemical sequence, dispensing of the first reagent is performed at the dispensing position A1 and the reaction vessel moves to the dispensing position A2 in the second apparatus cycle of the fifteenth biochemical sequence, where dispensing of the second reagent is performed. The movement from the first reagent dispensing position A1 to the second reagent dispensing position A2 requires 30 apparatus cycles. Since one apparatus cycle is assumed to be 10 seconds, it takes 300 seconds, or 5 minutes from the first reagent dispensing operation to the second reagent dispensing operation.

Also, the reaction vessel concerned moves to the reaction vessel take out position C2 in the second apparatus cycle of the thirty-first biochemical sequence, where it is taken out of the incubator 1 and discarded. The movement from the first reagent dispensing position A1 to the reaction vessel take out position C2 requires 62 apparatus cycles. Since one apparatus cycle is assumed to be 10 seconds, it takes 620 seconds, or about 10 minutes from the first reagent dispensing operation to the reaction vessel taking out operation. Thus, the reaction vessel is placed on the incubator 1 for the whole reaction time period in the biochemical inspection, during which the absorbance is measured by the spectrophotometer 15.

Furthermore, two apparatus cycles after that, the position which has become empty shifts to the reaction vessel installation position C1, a new reaction vessel is installed, and one apparatus cycle after that, it becomes ready for dispensing of the first reagent.

Figure 5:
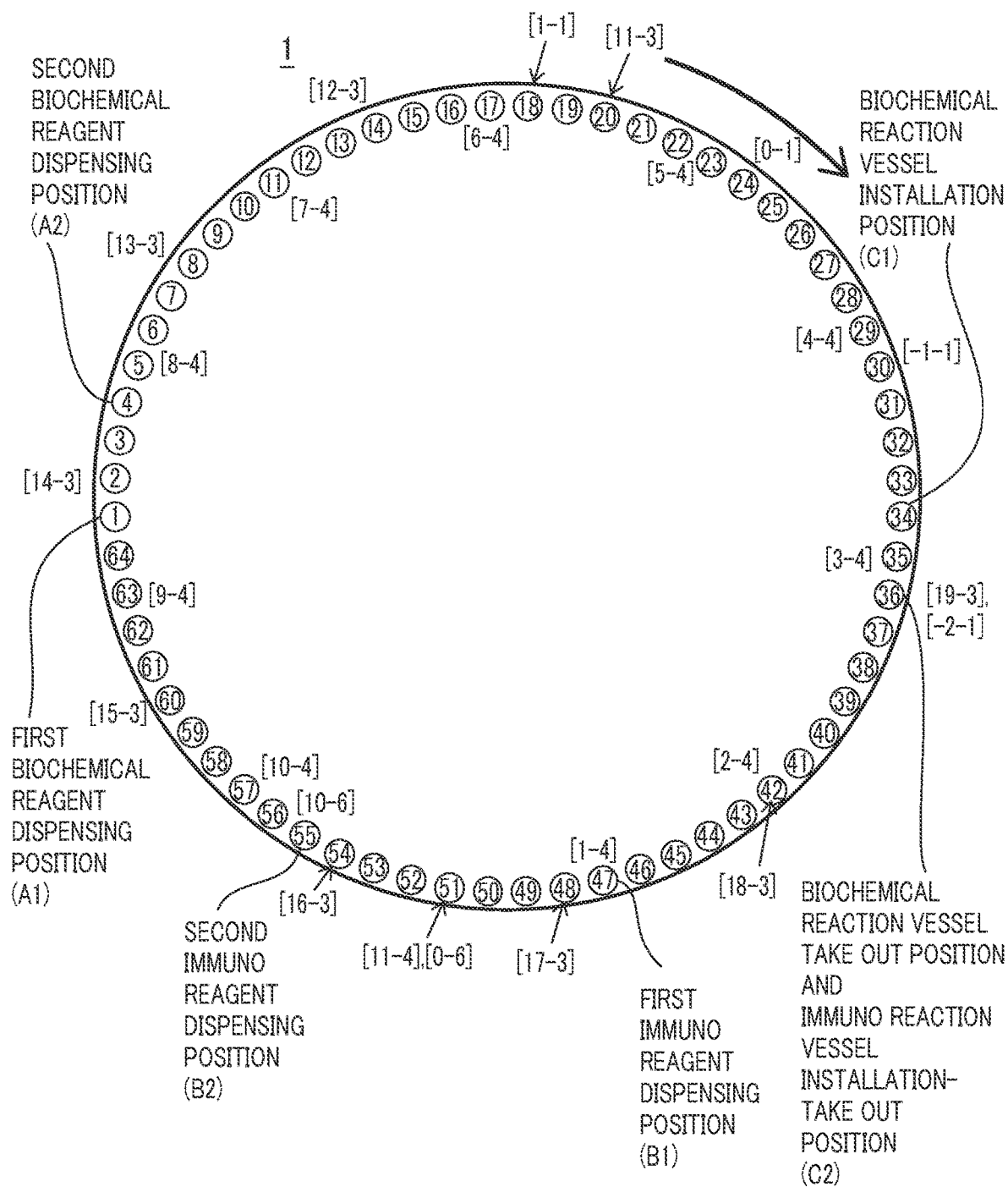
FIG. 5 is a view showing transportation of reaction vessels on the incubator in an immuno sequence.

FIG. 5 focuses immuno sequences in the automatic analyzer, showing how the reaction vessel at Position 47 in the fourth apparatus cycle of the first immuno sequence moves on the incubator 1. The immuno sequence is the one shown in Table 302. Since the positions on the incubator 1 are divided into positions for use in immuno inspection and positions for use in biochemical inspection as mentioned above, a sequence can be set so that the reaction time required for immuno inspection is satisfied independently from biochemical inspection. As in FIG. 4, timing is expressed in the form of [immno sequence-apparatus cycle] in the figure. For example, [9-4] in Position 63 indicates that the reaction vessel concerned is located at Position 63 in the fourth apparatus cycle of the ninth immuno sequence.

For the reaction vessel at Position 47 in the fourth apparatus cycle of the first immuno sequence, dispensing of the first reagent is performed at the dispensing position B1 and the reaction vessel moves to the dispensing position B2 in the sixth apparatus cycle of the tenth immuno sequence, where dispensing of the second reagent is performed. The movement from the first reagent dispensing position B1 to the second reagent dispensing position B2 requires 56 apparatus cycles. Since one apparatus cycle is assumed to be 10 seconds, it takes 560 seconds, or about 9 minutes from the first reagent dispensing operation to the second reagent dispensing operation.

Also, the reaction vessel concerned moves to the reaction vessel take out position C2 in the third apparatus cycle of the nineteenth immuno sequence and is taken out of the incubator 1 and transported to the detection mechanism 16. The movement from the first reagent dispensing position B1 to the reaction vessel take out position C2 requires 107 apparatus cycles. Since one apparatus cycle is assumed to be 10 seconds, it takes 1070 seconds, or about 18 minutes from the first reagent dispensing operation to the second reagent dispensing operation. Thus, the reaction vessel is placed on the incubator 1 for the whole reaction time period in the immuno inspection and after that, it is transported to the detection mechanism 16 by the dispensing tip/reaction vessel transporting mechanism 17.

The reaction vessel at Position 47 in the fourth apparatus cycle of the first immuno sequence should be installed at the reaction vessel installation position C2 in the first apparatus cycle of the (−2)th immuno sequence (namely, three sequences before the first immuno sequence) and in this case, the reaction vessel is installed at that position.

In the automatic analyzer in this embodiment, since a reaction vessel 2 on the incubator 1 is measured by the spectrophotometer 15, the incubator 1 is required to rotate with regularity. On the other hand, a dispensing mechanism that can be compact and is capable of arc-shaped movement around a rotation axis as a center and vertical movement is used for the first dispensing mechanism 8 and second dispensing mechanism 9 that are used to dispense a specimen and a reagent. Therefore, the freedom in the position that enables dispensing on the incubator 1 is considerably limited. The points that make it possible to achieve analysis processes with different reaction time periods on one incubator under this condition are summarized as follows.

(1) A dispensing mechanism that performs dispensing operation for an inspection with a first reaction time is assigned to the first dispensing mechanism 8 and a dispensing mechanism that performs dispensing operation for an inspection with a second reaction time is assigned to the second dispensing mechanism 9. In other words, even if the same reagent is used, dispensing operation is performed by the first dispensing mechanism 8 in the analysis process with the first reaction time, and by the second dispensing mechanism 9 in the analysis process with the second reaction time. Furthermore, in order to enable a plurality of reagents to be dispensed, an arrangement is made so that the locus of arc-shaped movement of the dispensing nozzle of the first dispensing mechanism 8 and the locus of arc-shaped movement of the dispensing nozzle of the second dispensing mechanism 9 intersect the circumference of the incubator 1 on which reaction vessels 2 are arranged, each at two positions.

(2) The locus of arc-shaped movement of the dispensing nozzle of the first dispensing mechanism 8 and the locus of arc-shaped movement of the dispensing nozzle of the second dispensing mechanism 9 should not intersect with each other. For this purpose, it is desirable to minimize the overlap between the locus of arc-shaped movement of the dispensing nozzle of one dispensing mechanism and the circumference of the incubator 1 on which reaction vessels 2 are arranged. Here, it is useful that the amount of rotation of the incubator 1 in one apparatus cycle is {(k±0.5) rotations±1 position} and a biochemical sequence with a shorter reaction time is defined by two apparatus cycles. In the dispensing sequence shown in FIG. 3A, dispensing of the first reagent is performed in an odd-numbered apparatus cycle and dispensing of the second reagent is performed in an even-numbered apparatus cycle. Since the incubator 1 shown in FIG. 2 has 64 positions, the reaction vessel into which the first reagent has been dispensed at the first reagent dispensing position A1 is located at a position near the first reagent dispensing position A1 in an odd-numbered apparatus cycle after about 30 apparatus cycles. By taking that position as the second reagent dispensing position A2 and setting the apparatus cycle time, etc. so as to fit the reaction time in the biochemical sequence, the overlap between the locus of arc-shaped movement of the first dispensing mechanism 8 for performing the biochemical sequence and the circumference of the incubator 1 on which reaction vessels 2 are arranged can be minimized.

Therefore, the freedom in the arrangement of the locus of arc-shaped movement of the dispensing nozzle of the second dispensing mechanism 9 for an immuno sequence with a longer reaction time can be increased. In addition, since an immuno sequence consists of more apparatus cycles than a biochemical sequence, it is easy to define an immuno sequence in which the second dispensing mechanism 9 can be arranged appropriately.

LIST OF REFERENCE SIGNS

1 incubator
2 reaction vessels
3 containing part in common with reagent-specimen
4 reagent bottles
5 specimen vessels
6 reagent aspirating position
7 specimen aspirating position
8 first dispensing mechanism
9 second dispensing mechanism
10 pump for first dispensing mechanism
11 pump for second dispensing mechanism
12 first dispending nozzle cleaning tank
13 second dispending nozzle cleaning tank
14 reagent stirring mechanism
15 spectrophotometer
16 detection mechanism
17 dispensing tip/reaction vessel transporting mechanism
18 dispensing tip
19 dispensing tip tray
20 reaction vessel tray
21 dispensing tip/reaction vessel discarding box
22 dispensing tip installation position
23 dispensing tip discarding position
28 control part
301, 302 table

What is claimed is:

1. An automatic analyzer capable of performing inspection for a plurality of different analysis processes, comprising:
    an incubator for holding plural reaction vessels on circumferential positions;
    a first dispensing mechanism having a first dispensing nozzle capable of arc-shaped movement around a rotational axis as a center and vertical movement, and constructed for dispensing a specimen or a reagent to the reaction vessel on the incubator;
    a second dispensing mechanism having a second dispensing nozzle capable of arc-shaped movement around a rotational axis as a center and vertical movement, and also constructed for dispensing a specimen or a reagent to the reaction vessel on the incubator, wherein a path of the arc-shaped movement of the second mechanism comprises a first plurality of reagent aspirating positions, a specimen aspirating position, a second plurality of reaction vessel positions, a dispensing tip installation position, and a dispensing tip discarding position;
    a dispensing tip/reaction vessel transporting mechanism for supplying the reaction vessel to the incubator;
    a spectrophotometer comprising a light source and a first detector configured to measure light absorbance of a reaction liquid comprising the specimen and the reagent;
    a second detector comprising a photomultiplier configured to measure a luminescence of a marker substance; and
    a control part,
    wherein the inspection for a plurality of analysis processes includes a first inspection for a first analysis process using the first detector, and a second inspection for a second analysis process using the second detector, the first analysis process and the second analysis process being different processes, a reaction time from dispensing of the reagent into a specimen solution to completion of reaction between the specimen solution and the reagent is predetermined in the first inspection and the second inspection, a first reaction time is determined for the first inspection and a second reaction time longer than the first reaction time is determined for the second inspection,
    wherein the control part is configured to operate the first dispensing mechanism and the dispensing tip/reaction vessel transporting mechanism in accordance with a previously defined first sequence and operates the second dispensing mechanism and the dispensing tip/reaction vessel transporting mechanism in accordance with a previously defined second sequence, wherein the control part is further configured to cause the dispensing tip/reaction vessel transporting mechanism to dispose a first plurality of the reaction vessels along a circumference of the incubator so as to define the first sequence, and to cause the dispensing tip/reaction vessel transporting mechanism to dispose a second plurality of the reaction vessels along the circumference of the incubator so as to define the second sequence, wherein the first plurality of the reaction vessels of the first sequence are each arranged by the dispensing tip/reaction vessel transporting mechanism so as to be disposed alternately on positions of the incubator with respect to the second plurality of the reaction vessels of the second sequence, wherein the control part is further configured to cause a first locus of the arc-shaped movement of the first dispensing nozzle and a second locus of the arc-shaped movement of the second dispensing nozzle to intersect a circumference of the incubator on which the reaction vessels are arranged, each at two positions and the first locus and the second locus do not intersect, wherein the control part is further configured to cause the first dispensing mechanism performs a dispensing operation in the first inspection for the plurality of reaction vessels supplied by the dispensing tip/reaction vessel transporting mechanism in accordance with the first sequence, and the second dispensing mechanism performs a dispensing operation in the second inspection for the plurality of reaction vessels supplied by the dispensing tip/reaction vessel transporting mechanism in accordance with the second sequence, wherein the first inspection is a biochemical inspection and the second inspection is an immuno inspection, and wherein the control part is further configured to cause the first dispensing mechanism to perform a stirring operation between the specimen solution and the reagent through pipetting by using the first dispensing nozzle, and to cause the second dispensing mechanism to perform a stirring operation between the specimen solution and the reagent through pipetting by the dispensing tip installed to the second dispensing nozzle.

2. The automatic analyzer according to claim 1, wherein the control part is further configured to cause the first sequence and the second sequence to each be defined as a sequence including an even number of apparatus cycles of a predetermined period, and the incubator is defined to move in a prescribed direction by $\{(k+0.5)$ rotations$\pm 1$ position$\}$ (k: 0 or greater integer) in the apparatus cycle.

3. The automatic analyzer according to claim 2, wherein the control part is further configured to cause the first sequence to include a first reagent dispensing operation of dispensing a first reagent into the specimen solution and a second reagent dispensing operation of dispensing a second reagent into the specimen solution after the first reagent dispensing operation, and the first sequence to be performed as a sequence including two apparatus cycles, so as to install and take out reaction vessels to and from the incubator by the dispensing tip/reaction vessel transporting mechanism, in an apparatus cycle different from the apparatus cycle of performing the first reagent dispensing operation.

4. The automatic analyzer according to claim 3, wherein the control part is further configured to cause the second sequence to be performed as a sequence including an even number of apparatus cycles such that the quotient obtained by dividing the number of the apparatus cycles with 2 is an odd number.

5. The automatic analyzer according to claim 4, wherein the control part is further configured to cause the second sequence to be performed so that the reaction vessels are installed to or taken out from the incubator by the dispensing tip/reaction vessel transporting mechanism in the apparatus cycle different from the apparatus cycle defined to install and take out the reaction vessels to and from the incubator in the first sequence.

6. The automatic analyzer according to claim 1, wherein the reaction vessel is disposable.

7. An automatic analyzer capable of performing inspection for plural different analysis processes, comprising:

an incubator for holding plural reaction vessels on circumferential positions;

a transporting mechanism for supplying the reaction vessels to the incubator; and a control part, wherein the inspection includes a first inspection and a second inspection, and a reaction time from dispensing of a reagent into a specimen solution to completion of reaction between the specimen solution and the reagent is predetermined in the first inspection and the second inspection, a first reaction time is determined for the first inspection and a second reaction time longer than the first reaction time is determined for the second inspection, wherein the control part operates the transporting mechanism in accordance with a first sequence previously defined for the first inspection and a second sequence previously defined for the second inspection, wherein the first sequence and the second sequence are each defined as a sequence including an even number of apparatus cycles of a predetermined period and the incubator is defined to move in a prescribed direction by $\{(k+0.5)$ rotations$\pm 1$ position$\}$ (k: 0 or greater integer) in the apparatus cycle, and wherein, in a case where operation of the transporting mechanism is defined to be executed in an even-numbered apparatus cycle in the first sequence, the operation of the transporting mechanism is defined to be executed in an odd-numbered apparatus cycle in the second sequence, and in a case where the operation of the transporting mechanism is defined to be executed in an odd-numbered apparatus cycle in the first sequence, the operation of the transporting mechanism is defined to be executed in an even-numbered apparatus cycle in the second sequence, a first dispensing mechanism having a first dispensing nozzle capable of arc-shaped movement around a rotational axis as a center and vertical movement, and dispensing a specimen or a reagent to the reaction vessel on the incubator, a second dispensing mechanism having a second dispensing nozzle capable of arc-shaped movement around a rotational axis as a center and vertical movement, and dispensing a specimen or a reagent to the reaction vessel on the incubator, wherein a path of the arc-shaped movement of the second mechanism comprises a first plurality of reagent aspirating positions, a specimen aspirating position, a second plurality of reaction vessel positions, a dispensing tip installation position, and a dispensing tip discarding position, wherein a first locus of the arc-shaped movement of the first dispensing nozzle and a second locus of the arc-shaped movement of the second dispensing nozzle intersect a circumference of the incubator on which the reaction vessels are arranged, each at two positions and the first locus and the second locus do not intersect, wherein the first dispensing mechanism performs dispensing operation in the first inspection for the reaction vessel supplied by the transporting mechanism in accordance with the first sequence and the second dispensing mechanism performs dispensing operation in the second inspection for the reaction vessel supplied by the transporting mechanism in accordance with the second sequence, wherein the first inspection is a biochemical inspection and the second inspection is an immuno inspection, wherein the first dispensing mechanism performs an operation of stirring the specimen solution and the reagent by pipetting of the first dispensing nozzle, and wherein the second dispensing mechanism performs an operation of stirring the specimen solution and the reagent by pipetting using the dispensing tip installed to the second dispensing nozzle.

8. The automatic analyzer according to claim 7,
wherein the control part operates the first dispensing mechanism and the transporting mechanism in accordance with the first sequence and operates the second dispensing mechanism and the transporting mechanism in accordance with the second sequence.

9. The automatic analyzer according to claim 8,
wherein the first sequence includes a first reagent dispensing operation of dispensing a first reagent to the specimen solution and a second reagent dispensing operation of dispensing a second reagent to the specimen solution after the first reagent dispensing operation, and wherein the first sequence is defined as a sequence including two apparatus cycles, and defined to install and take out the reaction vessels to and from the incubator by the transporting mechanism, in an apparatus cycle different from the apparatus cycle for first reagent dispensing operation.

10. The automatic analyzer according to claim 9,
wherein it is defined that the quotient obtained by dividing the number of the apparatus cycles constituting the second sequence by 2 is an odd number.

11. An automatic analyzer capable of performing inspection for plural different analysis processes, comprising:
an incubator for holding plural reaction vessels on circumferential positions;
a first dispensing mechanism having a first dispensing nozzle capable of arc-shaped movement around a rotational axis as a center and vertical movement, and dispensing a specimen or a reagent to the reaction vessel on the incubator; and
a second dispensing mechanism having a second dispensing nozzle capable of arc-shaped movement around a rotational axis as a center and vertical movement, and dispensing a specimen or a reagent to the reaction vessel on the incubator,
wherein a path of the arc-shaped movement of the second mechanism comprises a first plurality of reagent aspirating positions, a specimen aspirating position, a second plurality of reaction vessel positions, a dispensing tip installation position, and a dispensing tip discarding position, wherein the inspection includes a first inspection and a second inspection, a reaction time from dispensing of the reagent into a specimen solution to completion of reaction between the specimen solution and the reagent is predetermined in the first inspection and the second inspection, wherein a first locus of the arc-shaped movement of the first dispensing nozzle and a second locus of the arc-shaped movement of the second dispensing nozzle intersect a circumference of the incubator on which the reaction vessels are arranged, each at two positions and the first locus and the second locus do not intersect, wherein the first dispensing mechanism is used for dispensing operation in the first inspection having a first reaction time and the second dispensing mechanism is used for dispensing operation in the second inspection having a second reaction time longer than the first reaction time, wherein the first inspection is a biochemical inspection and the second inspection is an immuno inspection, wherein the first dispensing mechanism performs stirring operation between the specimen solution and the reagent through pipetting by the first dispensing nozzle, and wherein the second dispensing mechanism performs stirring operation between the specimen solution and the reagent through pipetting by the dispensing tip installed to the second dispensing nozzle.

12. An automatic analyzer capable of performing inspection for plural different analysis processes, comprising:
an incubator for holding plural reaction vessels on circumferential positions;
a transporting mechanism for installing the reaction vessel onto the incubator or taking out the reaction vessel;
a first dispensing mechanism having a first dispensing nozzle capable of arc-shaped movement around a rotational axis as a center and vertical movement, and dispensing a specimen or a reagent to the reaction vessel on the incubator;
a second dispensing mechanism having a second dispensing nozzle capable of arc-shaped movement around a rotational axis as a center and vertical movement, and dispensing a specimen or a reagent to the reaction vessel on the incubator;
a spectrophotometer having a light source and a detector for detecting light from the light source that is transmitted through a reaction liquid in the reaction vessel on the incubator; and
a detection mechanism for measuring luminescence of a marker substance contained in the reaction liquid in the reaction vessel,
wherein a path of the arc-shaped movement of the second mechanism comprises a first plurality of reagent aspirating positions, a specimen aspirating position, a second plurality of reaction vessel positions, a dispensing tip installation position, and a dispensing tip discarding position,
wherein the inspection includes a first inspection as a biochemical inspection and a second inspection as an immuno inspection and a reaction time from dispensing of the reagent into a specimen solution to completion of reaction between the specimen solution and the reagent is predetermined in the first inspection and the second inspection, wherein the first dispensing mechanism is used for dispensing operation in the first inspection having a first reaction time and the second dispensing mechanism is used for dispensing operation in the second inspection having a second reaction time longer than the first reaction time, wherein the first dispensing mechanism performs stirring operation between the specimen solution and the reagent through pipetting by the first dispensing nozzle, and wherein the second dispensing mechanism performs stirring operation between the specimen solution and the reagent through pipetting by the dispensing tip installed to the second dispensing nozzle, and wherein in the first inspection, absorbance of the reaction liquid in the reaction vessel is measured by the spectrophotometer during the first reaction time and in the second inspection, after end of the second reaction time, the reaction vessel is taken out of the incubator and transported to the detection mechanism by the transporting mechanism.

13. The automatic analyzer according to claim 12, wherein the detection mechanism detects the marker substance, based on a principle of electrochemical luminescence or chemiluminescence.

* * * * *